United States Patent Office 2,710,288
Patented June 7, 1955

2,710,288

SORBIC ACID ESTERS OF CELLULOSE

William B. Hewson, Wilmington, Del., assignor to Hercules Powder Company, Wilmington, Del., a corporation of Delaware No Drawing. Application December 30, 1950,
Serial No. 203,797

19 Claims. (Cl. 260—17)

This invention relates to cellulose esters containing unsaturated organic acid groups and, more particularly, to cellulose esters containing the sorbate group.

Cellulose esters containing unsaturated organic acid groups such as acrylate, methacrylate, crotonate, undecylenate, oleate, linoleate, linolenate, tiglate, cinnamate, and furoate are known. Mixed esters such as cellulose acetate containing these unsaturated organic acid groups are also known. Many of these esters have been reported to be insolubilized by exposure to polymerization conditions. However, films of these insolubilized esters have not been acceptable to the trade because films thereof lack the flexibility and elasticity desired in plastic films. Moreover, mixed esters containing certain of the low molecular weight unsaturated acids polymerize so readily as to require special methods for their production so as to avoid insolubilization before the product can be obtained in an acceptable form. Likewise, the low molecular weight unsaturated acids frequently polymerize without esterifying the cellulose. Moreover, the insolubilization of other of the cellulose esters is either impossible or requires so much of the unsaturated acid group in the molecule that the insolubilized ester is soft and lacks the desirable properties normally attributed to cellulose esters. This is particularly true in the case of the esters of high molecular weight unsaturated acids.

It is the object of this invention to produce a cellulose ester having substantially all of the characteristics of cellulose esters of the low molecular weight organic acids and yet having the capability of insolubilization without loss of the important desirable characteristics of those esters. It is a further object to prepare such cellulose esters by processes not differing essentially from those used commercially for manufacture of the ordinary esters. It is a further object to prepare an insolubilized cellulose ester having improved dimensional stability and water permeability. It is an additional object to produce the insolubilized cellulose esters in various shaped forms. Other objects will appear hereinafter.

The objects are accomplished by the following invention wherein cellulose is esterified with an anhydride mixture of organic acids, said organic acids consisting essentially of sorbic acid in an amount within the range of about 0.0023 to about 0.13 mole fraction of said organic acids and a complementary amount of one or more acids of the group consisting of acetic acid, propionic acid, and butyric acid, the anhydride in the mixture being at least 3 moles per anhydroglucose unit of the cellulose whereby a cellulose acylate sorbate having a total degree of substitution of 3 and a sorboyl degree of substitution within the range of 0.01 to 0.35 is obtained. The cellulose acylate sorbate having a sorboyl degree of substitution within the range of 0.01 to 0.35 after being subjected to a partial hydrolysis will have a total degree of substitution within the range of about 2.2 to about 2.9 and a sorboyl degree of substitution within the range of about 0.01 to about 0.35, depending upon the extent of hydrolysis. The sorboyl appears to be very little affected by this degree of hydrolysis.

The following examples are presented to illustrate the process for the production of the cellulose acylate sorbate of this invention and the method for its insolubilization. All parts and percentages are by weight unless otherwise specified.

*Example 1*

One hundred parts chemical cellulose moistened with 52.5 parts glacial acetic acid was placed in an acetylation mixer and to this was added 1875 parts methylene chloride, 972 parts acetic anhydride, 322 parts of a mixture prepared from equal weights of sorbic acid and acetic anhydride which had been heated to bring about chemical equilibrium, and as a catalyst 2.7 parts 72% perchloric acid and 4.9 parts 70% zinc chloride solution. This mixture was then kneaded in the acetylator at 22–25° C. for 16 hours to complete the reaction. To stop the reaction 5.8 parts 32% aqueous sodium acetate solution was added. The reaction dope was dissolved in acetone and poured into anhydrous methanol to recover the cellulose acetate sorbate as a precipitate. After the precipitate was washed with methanol and then with water, it was dried in air at 30° C. The resulting triester was analyzed for double bonds by bromine titration: this analysis showed a sorboyl D. S. (degree of substitution) of 0.09. This product was soluble in a 9:1 mixture of methylene chloride and ethanol. A 10–15% solution in such a solvent mixture was made up with 1% benzoyl peroxide based on the cellulose acetate sorbate added. A film cast from this solution was clear, colorless, and odorless both before and after it was rendered insoluble in methylene chloride-ethanol (9:1) by heating one minute at 150° C.

*Example 2*

One hundred parts chemical cellulose moistened with 44 parts glacial acetic acid was placed in an acetylation mixer and to this was added 834 parts cold methylene chloride, and 180 parts cold acetic anhydride. The catalyst was added as a solution of 0.767 part 72% perchloric acid and 2.05 parts 70% zinc chloride dissolved in 96.6 parts acetic anhydride. Sorbic acid was then added as an equilibrium mixture made from 19.6 parts sorbic acid and 19.6 parts acetic anhydride. The esterification was completed by kneading 1.7 hours while the temperature gradually rose to 45° C. and by continued kneading for 1.7 hours at 45° C. While kneading was continued, the reaction was stopped by adding 85 parts water. The product was then partially hydrolyzed (ripened) by adding 4.95 parts hydrochloric acid (sp. gr. 1.18) dissolved in 4.4 parts acetic acid and kneading at 40° C. for 20 hours, and then by adding 8.9 parts hydrochloric acid in 4.4 parts acetic acid and kneading at 49° C. for 3 hours. The product was then worked up by kneading with 87.5 parts 32% sodium acetate followed by evaporating the methylene chloride in vacuo, agitating the residue with water, wet grinding the precipitate with water washing, and finally drying at 50–90° C. This product easily formed a 7.1% solution in a 9:1 acetone:ethanol solvent, which solution had a viscosity of 80.4 cps. Based on bromine number for unsaturation and on acyl analysis of the product, the sorboyl D. S. was 0.03 and the acetyl D. S. was 2.44. A film cast from a 9:1 acetone:ethanol solution containing 1% benzoyl peroxide based on the solids was rendered insoluble by heating 2 minutes at 150° C.

A sample of the cellulose acetate sorbate amounting to 70 parts was ground to about 30 mesh and mixed with 30 parts diethyl phthalate containing 1 part di-tert-butyl peroxide and the mixture was milled for 5 minutes at 163° C. and sheeted. The sheeted material was ground to ⅛-inch cubes and injection molded into discs. A sample of the molded material had a Parr bar softening point of 228° C. A disc was also molded from a plastic prepared as above but without the peroxide catalyst. A sample of such a molded disc had a Parr bar softening point of 191° C.

*Example 3*

One hundred parts chemical cellulose moistened with 40 parts glacial acetic acid was placed in an acetylation mixer with a cold mixture of 417 parts methylene chloride, 180 parts acetic anhydride, 1.05 parts 95.5% sulfuric acid dissolved in 66.7 parts acetic anhydride, and 6.8 parts sorbic acid. The mixture was kneaded for ½ hour while the temperature rose slowly to 44° C. where kneading was continued for 5 hours longer. The reaction was then stopped by adding 67 parts water. After the mixture was kneaded at 43° C. for 18 hours 7.66 parts 95.5% sulfuric acid dissolved in 8.75 parts acetic acid was added and kneading was continued at 50° C. for 6.5 hours. After completing the hydrolysis, 87 parts 32% sodium acetate solution was added, the methylene chloride was evaporated under reduced pressure and the product was precipitated by mixing with water. The precipitate was ground wet and was thoroughly washed with water and finally dried at 50–90° C. This product had a sorboyl D. S. of 0.046 and an acetyl D. S. of 2.51. A 7.1% solution of the product in 9:1 acetone:ethanol had a viscosity of 75 cps. A solution of the product in 9:1 acetone:alcohol containing 1% benzoyl peroxide based on the solids content was used to form a film. This film was then rendered insoluble in methylene chloride and other solvents by heating for 30 minutes in boiling water.

*Example 4*

One hundred parts chemical cellulose moistened with 40 parts glacial acetic acid was placed in an acetylation mixer with 13.6 parts sorbic acid. To this was added a cold solution of 417 parts methylene chloride, 180 parts acetic anhydride, and 1.25 parts 95.5% sulfuric acid dissolved in 66.7 parts acetic anhydride. The mixture was kneaded for 1.2 hours while the temperature was being raised to 45° C. The temperature of kneading was then maintained at 45–52° C. for 7.5 hours after which acylation was stopped by the addition of 67 parts water followed by 15 hours kneading at 38° C. Then 7.66 parts 95.5% sulfuric acid in 8.75 parts acetic acid was added and kneading was continued at 48–52° C. for 6 hours after which 87 parts 32% sodium acetate was added with further kneading. The methylene chloride was evaporated under reduced pressure and the solid ester was precipitated by mixing with water, wet ground, water washed and air dried at 50–90° C.

The resulting product had a sorboyl D. S. of 0.06 and an acetyl D. S. of 2.49. A 7.1% solution of this product in 9:1 acetone:ethanol solution containing 1% benzoyl peroxide based on the solids content was clear, colorless, and odorless and was insolubilized by heating for 2 minutes at 150° C. The insolubilized film was also clear, colorless, and odorless.

A spinning solution was made up by dissolving 25 parts of the cellulose acetate sorbate produced in this Example 4 in 75 parts of acetone containing 4% water. The solution was made up by stirring at 40° C. until solution was complete and it was then clarified by filtering through cloth and allowed to become bubble free by standing for 8 hours at 40° C. This spinning solution was then extruded through a standard spinneret with 28 holes in standard spinning equipment. The filaments were dried at 100–120° C. under tension with hot air and twisted into a thread of 92 denier (28 filaments) with one-half twist per inch. The thread was unwound from the bobbins on which it was taken up in the spinning and wound loosely into a skein. The skein was then dropped into a boiling aqueous ethanol solution (20% alcohol) containing 0.1% benzoyl peroxide. After 20 minutes in the aqueous alcohol at 88° C. the skein was dried and tested for solubility in acetone. For this test a sample of the thread was weighed and then placed in acetone at room temperature. After an hour the sample was withdrawn, dried, and reweighed. While a thread of cellulose acetate sorbate before insolubilization was completely soluble in acetone under the same conditions, this insolubilized sample of thread was substantially insoluble and remained in the form of thread of substantially the same strength.

*Example 5*

Example 4 was repeated with the exception that only 12.3 parts sorbic acid was used and the final aqueous hydrolysis treatment was carried out using 13.8 parts hydrochloric acid in place of sulfuric acid. The resulting product had a sorboyl D. S. of 0.06 and an acetyl D. S. of 2.19. A 7.1% solution of this product in 9:1 acetone:ethanol had a viscosity of 96.4 cps. A film cast from a 9:1 acetone:ethanol solution containing 1% benzoyl peroxide based on solids content was rendered insoluble in methylene chloride and other solvents for cellulose esters either by heating for 10 minutes in boiling water or by heating for 2 minutes at 150° C.

*Example 6*

One hundred parts chemical cellulose moistened with 52 parts glacial acetic acid was placed in an acetylation mixer and to this was added 830 parts methylene chloride, 296 parts acetic anhydride, 99 parts sorbic acid and as a catalyst 0.81 part 72% perchloric acid and 2.08 parts 70% zinc chloride solution. This mixture was then kneaded in the acetylator at 22–25° C. for 24 hours to complete the reaction. To this reaction mixture was added 520 parts 9:1 methylene chloride-ethanol and to stop the reaction 87 parts 32% aqueous sodium acetate solution was added. The reaction dope was poured into anhydrous methanol to recover the cellulose acetate sorbate as a precipitate. After the precipitate was washed with methanol and then with water, it was dried in air at 25° C. The resulting triester was analyzed for double bonds by bromine titration: this analysis showed a sorboyl D. S. (degree of substitution) of 0.32. A film cast from a solution of this cellulose acetate sorbate was rendered insoluble in methylene chloride-ethanol (9:1) by heating one minute at 150° C. while being irradiated with ultraviolet light.

*Example 7*

Twenty parts cellulose moistened with 10 parts acetic acid was mixed with a solution of 100 parts propionic anhydride, 3.62 parts sorbic acid, and 166 parts methylene chloride along with 0.16 part 72% aqueous perchloric acid and 0.43 part 70% aqueous zinc chloride solution. The mixing was continued until acylation was complete. In the case of one-half of the product the reaction was stopped by addition of 5 parts sodium acetate (30%) solution and the reaction dope was then dissolved in acetone and poured into methanol to recover cellulose propionate acetate sorbate. After further purifying by water washing in the usual manner, the product was analyzed. It contained approximately 0.26 acetyl, 0.06 sorboyl, and 2.64 propionyl groups per anhydroglucose unit. This product when cast as a film from methylene chloride-ethanol (9:1) was insolubilized by boiling the film in 35% ethanol containing 0.01% potassium persulfate for 20 minutes.

The other half of the reaction mixture which had not been purified was subjected to hydrolysis in an acid mixture as in Example 3 using propionic acid in place of acetic acid. The purified hydrolyzed product then contained 0.05 sorboyl and 2.5 propionyl and only a trace of acetyl per anhydroglucose unit. A sample cast as a film from a film-casting solution was insolubilized by boiling the film in 20% ethanol containing 0.067% benzoyl peroxide for 20 minutes. The insolubilized film was highly flexible and had excellent dimensional stability

Example 8

Five parts cellulose moistened with 2.5 parts acetic acid was mixed with a solution of 30.5 parts butyric anhydride, 0.905 part sorbic acid, and 42 parts methylene chloride using 0.16 part 72% aqueous perchloric acid and 0.43 part 70% aqueous zinc chloride solution. The mixing was continued for 12 hours. Then to one-half the reaction mixture was added 5 parts 30% sodium acetate solution to stop the reaction. The resulting reaction dope was then dissolved in acetone and poured into methanol to precipitate the product. After thorough washing in the usual manner and drying, a cellulose acetate butyrate sorbate having approximately 0.07 sorboyl, 0.6 acetyl, and 2.3 butyryl was obtained. This product when cast as a film from a methylene chloride-ethanol (9:1) solution was readily insolubilized by heating in 20% aqueous ethanol containing 0.5% hydrogen peroxide for 15 minutes.

The remaining one-half of the cellulose acetate butyrate sorbate which had not been purified was hydrolyzed in an acid mixture as in Example 3 using butyric acid in place of acetic acid. The hydrolyzed product contained approximately 0.04 sorboyl and about 2.4 butyryl groups per anhydroglucose unit. A film cast from a film-casting solution of this hydrolyzed product was insolubilized by heating at 80° C. for 20 minutes in 20% aqueous ethanol containing 0.067% benzoyl peroxide. The insolubilized film was superior to a film of cellulose butyrate of a corresponding degree of substitution in having a higher softening point and greater dimensional stability.

These examples show that the sorbic acid may be used in the esterification process either as the acid or as the anhydride such as is produced by warming with the anhydride of the other organic acids used. The sorbic acid may also be used as the anhydride itself. When sorbic acid is used, it is believed that at least part of the sorbic acid forms an anhydride either with itself or with one of the other acids in the system. Likewise, when more than one anhydride is used in the acylation mixture, part of the anhydride is believed to be present as mixed anhydrides. The anhydride mixture will contain at least the theoretical amount of anhydride for complete esterification of the cellulose and for combination with any water liberated by such esterification. The acylation mixture may also contain in addition to anhydride part of the acid in the form of free acid which may act as a solvent.

For convenience in referring to the anhydride mixture of organic acids used for acylation, the ratio of acids in the mixture is referred to in terms of mole fraction of the mixture and the mole fractions are based upon the molecular weights of the acids themselves rather than those of the anhydrides. This is done for convenience in calculation since acids may be present not only as the free acid but also as the simple and mixed anhydride. Since the presence of anhydride is specified, the calculation of the components of the anhydride mixture in terms of moles of the acid involved is accurate and does not involve any ambiguity. Thus when the amount of anhydride is calculated as moles of acid, the moles acid is based upon the number of moles of acid which would result from hydrolysis of the anhydride. Since acetic acid, propionic acid, and butyric acid will normally be used in the form of their anhydrides, and sorbic acid will usually be measured in the form of the acid, it will be necessary when large amounts of sorbic acid are used to use sufficient excess organic anhydride in order to bring the total anhydride in the mixture up to the amount required for the esterification. In such cases, there is not any appreciable difference in results due to the form in which the acids are introduced even though the amount is expressed as moles of acid. In order to remain consistent, compositions are expressed in terms of mole fractions rather than per cents. The mole fraction of sorbic acid in an anhydride mixture is thus the ratio of the moles sorbic acid which would be produced by hydrolysis of that mixture to the total number of moles of organic acid that would be present in the hydrolyzed mixture. In distinction with the method of referring to moles of acid even though present as anhydride, any specific reference to moles of anhydride is based on the molecular weight of the anhydride.

The ratio of sorboyl groups introduced into cellulose to the total number of acyl groups introduced into the cellulose has been found to be dependent upon the mole fraction of sorbic acid (i. e., sorboyl) in the anhydride mixture (calculated as moles acid obtainable on hydrolysis). In order to introduce sufficient sorbate (sorboyl D. S.=0.01) into the molecule to effect at least partial insolubilization, the mole fraction of sorbic acid in the mixture must be at least about 0.0023. In order to introduce sufficient sorbate (sorboyl D. S.=0.05 or greater) to give a product capable of complete insolubilization, the sorbic acid (i. e., sorboyl) mole fraction should be at least 0.015. When the mole fraction of sorbic acid is about 0.0045, the sorboyl D. S. of the cellulose ester produced is about 0.02. When the mole fraction of sorbic acid is about 0.13, the sorboyl D. S. of the cellulose ester produced is about 0.35. These figures are fairly accurate for the case of an anhydride mixture produced from sorbic acid and acetic anhydride. When propionic acid or butyric acid in the form of their anhydrides is involved, the sorboyl D. S. is somewhat greater for the mole fractions designated. However, it is advantageous and preferable to have a slightly higher sorboyl D. S. in the cellulose ester when the cellulose ester is rich in butyryl groups.

The acylation of cellulose with an anhydride mixture containing sorbic acid (or its anhydride) may be carried out following any of the well-known acylation procedures which use acylic anhydride. Thus the acylation may be carried out using from theoretical to an excess of anhydride limited only by economic considerations. Preferably a range of about 3 to about 3.5 moles anhydride per anhydroglucose unit will be used. There may be present during the acylation solvents which aid in the esterification process such as acetic acid, propionic acid, or butyric acid corresponding to the anhydride used in the mixture or methylene chloride or related solvents which are useful in known acylation procedures. Likewise, the process may be a so-called fibrous process using nonsolvents for the cellulose ester such as hexane or carbon tetrachloride.

The acylation will usually be carried out using catalysts such as $H_2SO_4$, $ZnCl_2$, $ZnCl_2$—$HClO_4$ mixture, sulfonic acids such as methane sulfonic acid, zinc perchlorate, or methionic acid.

The acylation process is carried out at any temperature at which acylation will take place but below temperatures which cause appreciable degradation of the cellulose or polymerization of the sorboyl groups. A particularly useful temperature range is 20° C. to 60° C.

The product of acylation of cellulose is a typical ester of total D. S. 3 corresponding to a triacetate, tripropionate, triacetate butyrate, or the like in which part of the acylate groups are replaced by sorbate groups. Such a product has utility in fields where cellulose triacylates are used and appears to differ from the corresponding saturated ester chiefly in its capability of controlled insolubilization when subjected to polymerization conditions. However, after insolubilization, it differs in being less soluble than the cellulose triacylate and is, for instance, insoluble in a methylene chloride-ethanol (9:1) mixture. The sorboyl D. S. may be as low as 0.01 where partial insolubilizability is desired, or 0.05 or higher where complete insolubilizability is desired. For greater cross-linking the sorboyl D. S. may be up to about 0.35.

Cellulose acylate sorbate products of lower degrees of total substitution are obtainable as indicated in the examples by controlled hydrolysis of part of the acylate groups. The sorboyl groups are more difficultly displaced than the other ester groups in this hydrolysis process and in the case of an acetate sorbate there is substantially no loss of sorboyl groups in hydrolyzing from a degree of substitution of 3 to a degree of substitution of about 2.2. The method of carrying out the controlled hydrolysis is substantially that well known in the art for the hydrolysis of cellulose acylate and the conditions of hydrolysis are substantially the same.

The cellulose esters of total degrees of substitution between about 3 and about 2.2 which include a sorboyl degree of substitution of about 0.01 to about 0.35 have been found to have properties quite similar to those of the corresponding acetate, propionate, butyrate, etc., having similar degrees of substitution and they find similar utility depending upon their degree of substitution. They have, however, the added property which makes them superior to the corresponding esters of saturated acids in that they are capable of being insolubilized when subjected to polymerization conditions. The cellulose acetate sorbate, cellulose propionate sorbate, or cellulose acetate butyrate sorbate falling within the scope of this invention finds utility, for instance, in production of rayon filaments, molding plastics, films, and lacquers. The preferred D. S. for these uses lies in the range of about 0.02 to about 0.2 and the total degree of substitution will be about the same as that of the corresponding ester of saturated acids for the same utility. The products of greatest utility have a sorboyl D. S. in the range of 0.05 to 0.12. For use in rayon and films, the preferred sorboyl D. S. is about 0.05 to 0.07 and the preferred total D. S. is about 2.4 to about 2.6. For use in plastics, a sorboyl D. S. of about 0.02 to about 0.20 and a total D. S. of 2.2 to 2.4 are preferred. For use in the preparation of bristlelike filaments for use in paint brushes, the preferred sorboyl D. S. is 0.1 to 0.2 and the total D. S. is 2.4 to 2.6. In all of these products the cellulose acetate sorbate is preferred.

The cellulose acylate sorbate of this invention is insolubilized by subjecting to polymerization conditions. Such conditions are thought to involve the catalytic activity of free radicals. In the case of translucent and transparent materials, polymerization can be effected simply by exposure to actinic light. In the case of translucent or opaque materials, a free radical-forming catalyst such as a peroxide, preferably an organic peroxide such as benzoyl peroxide, may be used as a catalyst for the insolubilization. The catalyst may be incorporated in the cellulose acylate sorbate composition. For example, in the case of filaments it may be incorporated in the spinning composition, in the case of films it may be incorporated in the lacquer or film-casting composition, and in the case of molding powders, it may be incorporated before or after grinding of the molding powder. A particularly useful method of insolubilization has been found to lie in the treatment of the cellulose acylate sorbate with a hot solvent which swells but does not dissolve the cellulose ester. For instance, a filament or film containing peroxides may be insolubilized by heating for 10 to 20 minutes with boiling water. Moreover, a filament or film may be insolubilized by heating in boiling aqueous solutions containing a polymerization catalyst such as an aqueous alcohol solution of a water-soluble peroxide. Moreover, the insolubilization can be effected by heating in boiling water or aqueous alcohol in the absence of peroxides but substituting therefor radiation with actinic light. In place of aqueous alcohol, other aqueous solvents which swell but do not dissolve the cellulose ester may be similarly used. For instance, boiling 10–50% aqueous water-soluble swelling solvents containing benzoyl peroxide, hydrogen peroxide, potassium persulfate, and the like may be used. Swelling solvents which are useful in this method of insolubilization include aqueous solutions of water-soluble alcohols such as methanol, ethanol, propanol, and isopropyl alcohol, aqueous acetone, and the like. When using the boiling solvent method of insolubilization, the amount of catalyst in the solvent may be within the range of about 0.005% to about 5% of the swelling solvent. When the insolubilizing catalyst is incorporated in the cellulose ester, the amount of catalyst will ordinarily be within the range of about 0.1 to about 2% of the cellulose ester. While the insolubilization of the cellulose acylate sorbate is readily carried out in only a few minutes at 100° using the swelling solvent method of insolubilization, the insolubilization of a filament or film containing a catalyst but in the absence of any swelling solvent will require a temperature range up to about 150° to 200° C. to effect insolubilization in a corresponding length of time. However, the insolubilization in the absence of swelling solvents may also be carried out at temperatures as low as 50° C. if the heating is carried on over a period of several hours. In the absence of swelling solvents, a filament or film containing catalyst insolubilized satisfactorily at 140–150° C. in one-half hour or less. The preferred method of insolubilization is that involving heating the filament or film with a swelling solvent.

The cellulose acylate sorbates of this invention, after substantial insolubilization, are generally somewhat harder and higher melting than before insolubilization but they are not rendered brittle by the insolubilization process as has been found to be the case with other cellulose esters of low molecular unsaturated acids after polymerization. In fact, they have greater elasticity than the corresponding ester containing no sorbate groups. Moreover, they are still fusible after insolubilization. Furthermore, they have greater water resistance and much less reversible water elongation. The cellulose acylate sorbates also have the advantage over other polymerizable cellulose esters in that their polymerization is controllable and the sorbic acid does not tend to insolubilize in place of combining with the cellulose ester during the process of its preparation. Furthermore, the degree of polymerization of any specific cellulose acylate sorbate ester of this invention is easily controllable. It has been found advantageous over other cellulose esters of unsaturated acids in that it is capable of being insolubilized at a very low degree of substitution of the unsaturated acid. It has a still further advantage in that the good properties of the cellulose ester are not lost in the introduction of sorbate groups. Moreover, there is no odor introduced by the incorporation of sorbate groups.

The insolubilized products of this invention have improved characteristics that make them particularly suited for various uses. The insolubility in organic solvents is particularly advantageous in paint brush bristles which show no swelling in paint solvents; in rayon fibers which have increased resistance to dry cleaning solvents; and in lacquer coatings which have increased resistance to water, alcohol and nail lacquer solvents. The increased softening point is particularly advantageous in rayon fabrics which can withstand higher ironing temperatures.

The desirable combination of properties exhibited by the new products of this invention make them suitable for use in light-transmitting reinforced window glazing for solaria, poultry houses and safety areas, in airplane dopes, in artificial textile fibers such as rayon-type filaments and artificial brush bristles, in printing inks, in protective coatings, in adhesives, in laminated structures comprising paper, textile fibers or fabrics, wood, metals, glass, glass fibers, woven glass fabrics, leather, and the like, in insulation, in expanded porous structures and in plastic molding compositions and molded articles. They also find application in the impregnation of paper, textile fibers and fabrics, wood, leather, and other porous articles. Additionally, the new products of this invention are especially well adapted for all types of thermoplastic molding including compression, injection and extrusion molding and including the formation of films, filaments, and coated wire. The products of this invention may be put into the form for the uses indicated above before insolubilization or after insolubilization whichever is preferred in the specific instance. Therefore, the improved properties possessed by the products of this invention suggest their use in many applications.

The present process of producing an insolubilizable cellulose ester by the introduction of a sorbate group has the advantage that the sorbic acid in the spent acids is readily recoverable by a process of extraction and subsequent distillation. In view of the small amount of sorbic acid which is required in the acylating mixture combined with the ease of recovery of spent sorbic acid makes the process commercially attractive. Moreover, the process of introducing the sorboyl groups in the same process in which the acyl groups are introduced is particularly advantageous in that the number of operations is not increased.

What I claim and desire to protect by Letters Patent is:

1. The method of making fiber-free methylene chloride: ethanol (9:1) soluble cellulose acylate sorbate having the characteristic of being rendered insoluble in methylene chloride:ethanol (9:1) by the action of polymerization catalysts which comprises intimately contacting cellulose at a temperature in the range of about 20° C. to about 60° C. in the presence of a noncombining acylation catalyst of the group consisting of $ZnCl_2$, $ZnCl_2$-$HClO_4$ mixture, methane sulfonic acid, zinc perchlorate, and methionic acid until esterification is essentially complete with an anhydride mixture of organic acids consisting essentially of sorbic acid in an amount within the range of about 0.0023 to about 0.13 mole fraction of said organic acids and a complementary amount of at least one acid of the group consisting of acetic acid, propionic acid, and butyric acid, the anhydride in the mixture being at least 3 moles per anhydroglucose unit.

2. The method of making fiber-free methylene chloride: ethanol (9:1) soluble cellulose acylate sorbate having the characteristic of being rendered insoluble in methylene chloride:ethanol (9:1) by the action of polymerization catalysts which comprises intimately contacting cellulose at a temperature in the range of about 20° C. to about 60° C. in the presence of a noncombining acylation catalyst of the group consisting of $ZnCl_2$, $ZnCl_2$-$HClO_4$ mixture, methane sulfonic acid, zinc perchlorate, and methionic acid until esterification is essentially complete with an anhydride mixture of organic acids consisting essentially of sorbic acid in an amount within the range of about 0.0023 to about 0.13 mole fraction of said organic acids and a complementary amount of at least one acid of the group consisting of acetic acid, propionic acid, and butyric acid, the anhydride in the mixture being at least 3 moles per anhydroglucose unit until the esterification is complete and subsequently hydrolyzing to a total D. S. not less than 2.2.

3. The method of making fiber-free methylene chloride: ethanol (9:1) soluble cellulose acetate sorbate having the characteristic of being rendered insoluble in methylene chloride:ethanol (9:1) by the action of polymerization catalysts which comprises intimately contacting cellulose at a temperature in the range of about 20° C. to about 60° C. in the presence of a noncombining acylation catalyst of the group consisting of $ZnCl_2$, $ZnCl_2$-$HClO_4$ mixture, methane sulfonic acid, zinc perchlorate, and methionic acid until esterification is essentially complete with an anhydride mixture of organic acids consisting essentially of sorbic acid in an amount within the range of about 0.0023 to about 0.13 mole fraction of the organic acids and a complementary amount of acetic acid, the anhydride in the mixture being at least 3 moles per anhydroglucose unit.

4. The method of making fiber-free methylene chloride: ethanol (9:1) soluble cellulose acetate sorbate having the characteristic of being rendered insoluble in methylene chloride:ethanol (9:1) by the action of polymerization catalysts which comprises intimately contacting cellulose at a temperature in the range of about 20° C. to about 60° C. in the presence of a noncombining acylation catalyst of the group consisting of $ZnCl_2$, $ZnCl_2$-$HClO_4$ mixture, methane sulfonic acid, zinc perchlorate, and methionic acid until esterification is essentially complete with an anhydride mixture of organic acids consisting essentially of sorbic acid in an amount within the range of about 0.0023 to about 0.13 mole fraction of said organic acids and a complementary amount of acetic acid, the anhydride in the mixture being at least 3 moles per anhydroglucose unit until the esterification is complete and subsequently hydrolyzing to a total D. S. not less than 2.2.

5. Fiber-free methylene chloride:ethanol (9:1) soluble cellulose acylate sorbate in which the acylate is at least one of the group consisting of acetate, propionate, and butyrate, and in which the total degree of substitution is within the range of about 2.2 to 3 and the sorbate degree of substitution is within the range of about 0.01 to about 0.35, said cellulose acylate sorbate having the characteristic of being rendered insoluble in methylene chloride: ethanol (9:1) by heating at a temperature in the range of 50–200° C. with a polymerization catalyst and being free of combined acylation catalyst.

6. Fiber-free methylene chloride:ethanol (9:1) soluble cellulose acylate sorbate in which the acylate is at least one of the group consisting of acetate, propionate, and butyrate, and in which the total degree of substitution is within the range of about 2.2 to 3.0 and the sorbate degree of substitution is within the range of about 0.02 to about 0.20, said cellulose acylate sorbate having the characteristic of being rendered insoluble in methylene chloride: ethanol (9:1) by heating at a temperature in the range of 50–200° C. with a polymerization catalyst and being free of combined acylation catalyst.

7. Fiber-free methylene chloride:ethanol (9:1) soluble cellulose acylate sorbate in which the acylate is at least one of the group consisting of acetate, propionate, and butyrate, and in which the total degree of substitution is within the range of about 2.2 to 3.0 and the sorbate degree of substitution is within the range of about 0.05 to about 0.12, said cellulose acylate sorbate having the characteristic of being rendered insoluble in methylene chloride: ethanol (9:1) by heating at a temperature in the range of 50–200° C. with a polymerization catalyst and being free of combined acylation catalyst.

8. Fiber-free methylene chloride:ethanol (9:1) soluble cellulose acetate sorbate in which the total degree of substitution is within the range of about 2.2 to 3 and the sorbate degree of substitution is within the range of about 0.01 to 0.35 having solubility characteristics similar to cellulose acetate of substantially the same total degree of substitution and being free of combined acetylation catalyst and having the additional characteristic of being rendered insoluble in methylene chloride:ethanol (9:1) by heating at a temperature in the range of 50–200° C. with a polymerization catalyst.

9. Fiber-free methylene chloride:ethanol (9:1) soluble cellulose acetate sorbate in which the total degree of substitution is within the range of about 2.2 to 3.0 and the sorbate degree of substitution is within the range of about 0.02 to about 0.20 having solubility characteristics similar to cellulose acetate of substantially the same total degree of substitution and being free of combined acetylation catalyst and having the additional characteristic of being rendered insoluble in methylene chloride:ethanol (9:1) by heating at a temperature in the range of 50–200° C. with a polymerization catalyst.

10. Fiber-free methylene chloride:ethanol (9:1) soluble cellulose acetate sorbate in which the total degree of substitution is within the range of about 2.2 to 3.0 and the sorbate degree of substitution is within the range of about 0.05 to about 0.12 having solubility characteristics similar to cellulose acetate of substantially the same total degree of substitution and being free of combined acetylation catalyst and having the additional characteristic of being rendered insoluble in methylene chloride:ethanol (9:1) by heating at a temperature in the range of 50–200° C. with a polymerization catalyst.

11. Fiber-free methylene chloride:ethanol (9:1) soluble cellulose acylate sorbate in which the acylate group is at least one of the group consisting of acetate, propionate, and butyrate, and in which the total degree of substitution is within the range of about 2.2 to 3.0 and the sorbate degree of substitution is within the range of about 0.01 to 0.35, said cellulose acylate sorbate being free of combined acylation catalyst and having been rendered substantially insoluble by heating at a temperature in the range of 50–200° C. with a polymerization catalyst.

12. A shaped article of cellulose acylate sorbate characterized by substantial insolubility in organic solvents, said cellulose acylate sorbate having a total degree of substitution within the range of 2.2 to 3.0 and a sorboyl degree of substitution within the range of 0.01 to 0.35 and in which the acylate is at least one of the group consisting of acetate, propionate, and butyrate, said cellulose acylate sorbate having been rendered substantially insoluble by heating at a temperature in the range of 50–200° C. with a polymerization catalyst.

13. A bristlelike filament of cellulose acylate sorbate characterized by substantial insolubility in organic solvents, said cellulose acylate sorbate having a total degree of substitution within the range of 2.2 to 3.0 and a sorboyl degree of substitution within the range of 0.05 to 0.12 and in which the acylate is at least one of the group consisting of acetate, propionate and butyrate, said cellulose acylate sorbate having been rendered substantially insoluble by heating at a temperature in the range of 50–200° C. with a polymerization catalyst.

14. A rayon-type filament of cellulose acylate sorbate characterized by substantial insolubility in organic solvents, said cellulose acylate sorbate having a total degree of substitution within the range of 2.2 to 3.0 and a sorboyl degree of substitution within the range of 0.05 to 0.12 and in which the acylate is at least one of the group consisting of acetate, propionate, and butyrate, said cellulose acylate sorbate having been rendered substantially insoluble by heating at a temperature in the range of 50–200° C. with a polymerization catalyst.

15. A film of cellulose acylate sorbate characterized by substantial insolubility in organic solvents, said cellulose acylate sorbate having a total degree of substitution within the range of 2.2 to 3.0 and a sorboyl degree of substitution within the range of 0.05 to 0.12 and in which the acylate is at least one of the group consisting of acetate, propionate, and butyrate, said cellulose acylate sorbate having been rendered substantially insoluble by heating at a temperature in the range of 50–200° C. with a polymerization catalyst.

16. A formed plastic of cellulose acylate sorbate characterized by substantial insolubility in organic solvents, said cellulose acylate sorbate having a total degree of substitution within the range of 2.2 to 3.0 and a sorboyl degree of substitution within the range of 0.05 to 0.12 and in which the acylate is at least one of the group consisting of acetate, propionate, and butyrate, said cellulose acylate sorbate having been rendered substantially insoluble by heating at a temperature in the range of 50–200° C. with a polymerization catalyst.

17. Fiber-free, methylene chloride:ethanol (9:1) soluble cellulose acylate sorbate in which the acylate group is at least one of the group consisting of acetate, propionate, and butyrate and in which the total degree of substitution is 3 and the sorbate degree of substitution is within the range of about 0.01 to about 0.35 having solubility characteristics similar to cellulose triacylate free of sorboyl groups and being free of combined acylation catalyst and having the additional characteristic of being rendered insoluble in methylene chloride:ethanol (9:1) by heating at a temperature in the range of 50–200° C. with a polymerization catalyst.

18. Fiber-free, methylene chloride:ethanol (9:1) soluble cellulose acetate sorbate in which the total degree of substitution is 3 and the sorbate degree of substitution is within the range of about 0.1 to about 0.35 having solubility characteristics similar to cellulose triacylate free of sorboyl groups and being free of combined acylation catalyst and having the additional characteristic of being rendered insoluble in methylene chloride:ethanol (9:1) by heating at a temperature in the range of 50–200° C. with a polymerization catalyst.

19. Fiber-free, methylene chloride:ethanol (9:1) soluble cellulose acetate sorbate in which the total degree of substitution is 3 and the sorbate degree of substitution is within the range of about 0.01 to 0.35 being free of combined acylation catalyst and having been rendered insoluble in methylene chloride:ethanol (9:1) by heating at a temperature in the range of 50–200° C. with a polymerization catalyst.

References Cited in the file of this patent

UNITED STATES PATENTS

| | | |
|---|---|---|
| 2,241,226 | Malm et al. | May 6, 1941 |
| 2,322,575 | Hill | June 22, 1943 |
| 2,396,165 | Ernsberger et al. | Mar. 5, 1946 |
| 2,475,273 | Adelson et al. | July 5, 1949 |
| 2,520,711 | Charch | Aug. 29, 1950 |